US00RE51063E

(19) United States
(12) Reissued Patent
Kitami

(10) Patent Number: US RE51,063 E
(45) Date of Reissued Patent: Oct. 13, 2026

(54) SHOE

(71) Applicant: ASICS CORPORATION, Kobe (JP)

(72) Inventor: Ryota Kitami, Kobe (JP)

(73) Assignee: ASICS CORPORATION, Hyogo (JP)

(21) Appl. No.: 30/025,318

(22) Filed: Sep. 26, 2025

Related U.S. Patent Documents

Reissue of:
(64) Patent No.: Des. 1,053,544
Issued: Dec. 10, 2024
Appl. No.: 29/872,277
Filed: Mar. 9, 2023

(30) Foreign Application Priority Data

Sep. 12, 2022 (JP) ..... 2022-019510 D

(51) LOC (15) Cl. ..... 02-04
(52) U.S. Cl.
USPC ..... D2/972
(58) Field of Classification Search
USPC ..... D2/896, 900, 902, 904, 906–908, D2/916–924, 925–945, 969–979
CPC .... A43B 1/00; A43B 1/10; A43B 1/12; A43B 1/14; A43B 3/00; A43B 3/10; A43B 3/12; A43B 3/14; A43B 5/00; A43B 5/001; A43B 5/002; A43B 5/003; A43B 5/007; A43B 5/008; A43B 5/02; A43B 5/06; A43B 5/10; A43B 5/12; A43B 5/14; A43B 13/00; A43B 13/02; A43B 13/023; A43B 13/026; A43B 13/04; A43B 13/14; A43B 13/141; A43B 13/18; A43B 13/181
See application file for complete search history.

(56) References Cited

U.S. PATENT DOCUMENTS

D293,970 S * 2/1988 Brown ..... D2/970
D294,998 S * 4/1988 Brown ..... D2/973
D296,262 S * 6/1988 Brown ..... D2/973
D439,399 S * 3/2001 Matis ..... D2/969
D441,175 S * 5/2001 Ritter ..... D2/907
D482,854 S * 12/2003 Burg ..... D2/969
D508,306 S * 8/2005 Amado ..... D2/972
(Continued)

*Primary Examiner* — Darlington Ly
(74) *Attorney, Agent, or Firm* — Morgan, Lewis & Bockius LLP

(57) CLAIM

The ornamental design for a shoe, as shown and described.

DESCRIPTION

*This application is an application for reissue of U.S. Design Pat. No. D1,053,544, which issued on Dec. 10, 2024 from U.S. Design application Ser. No. 29/872,277, filed on Mar. 3, 2023, which claims priority to Japanese Design Patent Application Serial No. 2022-019510 filed Sep. 12, 2022, each of which are incorporated herein by reference in their entirety.*

FIG. 1 is a front perspective view of a shoe showing my new design;
FIG. 2 is a front elevational view thereof;
FIG. 3 is a rear elevational view thereof;
FIG. 4 is a left-side elevational view thereof;
FIG. 5 is a right-side elevational view thereof;
FIG. 6 is a top plan view thereof; and,
FIG. 7 is a bottom plan view thereof.
The *dash-dash* broken lines depict portions of the shoe that form no part of the claimed design. *The dash-dot-dash broken lines illustrate boundaries that form no part of the claimed design.*

1 Claim, 6 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| D545,041 | S | * | 6/2007 | Burg | D2/972 |
| D563,664 | S | * | 3/2008 | Petrie | D2/972 |
| D760,482 | S | * | 7/2016 | Siegel | D2/902 |
| D840,660 | S | * | 2/2019 | Link | D2/972 |
| D875,372 | S | * | 2/2020 | Gibson | D2/972 |
| D899,749 | S | * | 10/2020 | Weddle | D2/969 |
| D913,676 | S | * | 3/2021 | Matthews | D2/972 |
| D925,203 | S | * | 7/2021 | McMillan | D2/972 |
| D929,113 | S | * | 8/2021 | Winfield | D2/974 |
| D945,765 | S | * | 3/2022 | Kuerbis | D2/973 |
| D947,505 | S | * | 4/2022 | Lin | D2/908 |
| D995,097 | S | * | 8/2023 | Jackson | D2/973 |
| D1,007,836 | S | * | 12/2023 | Bidal | D2/972 |
| D1,019,112 | S | * | 3/2024 | Popovic | D2/972 |
| D1,020,217 | S | * | 4/2024 | Popovic | D2/972 |
| D1,021,344 | S | * | 4/2024 | Duquenoy | D2/908 |
| D1,053,544 | S | * | 12/2024 | Kitami | D2/972 |
| D1,124,623 | S | * | 5/2026 | Sebastian | D2/972 |

* cited by examiner

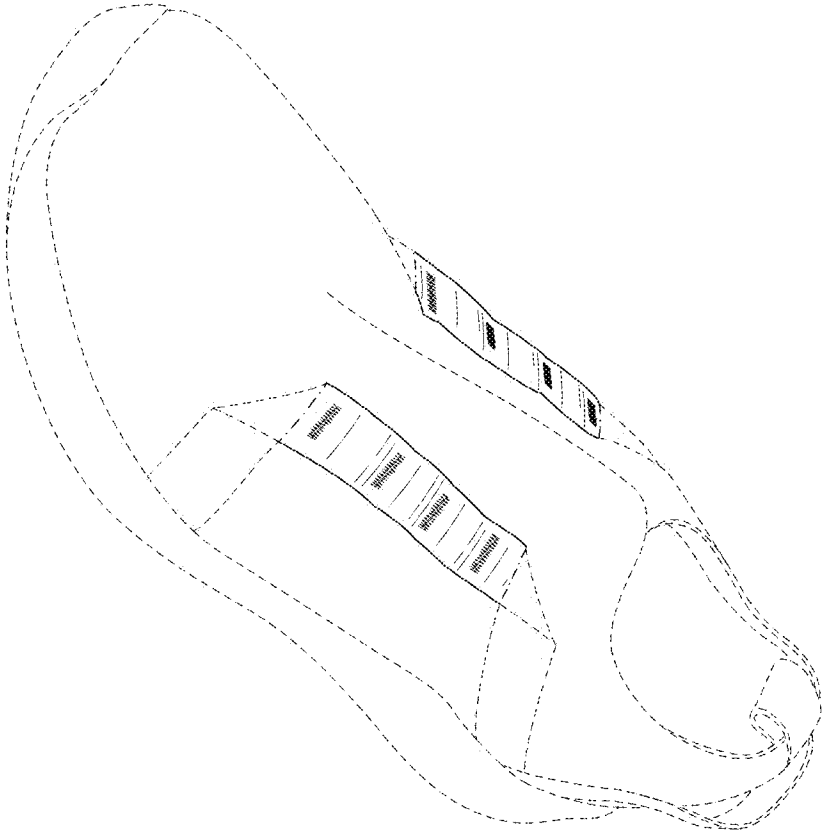
FIG. 1 (Amended)

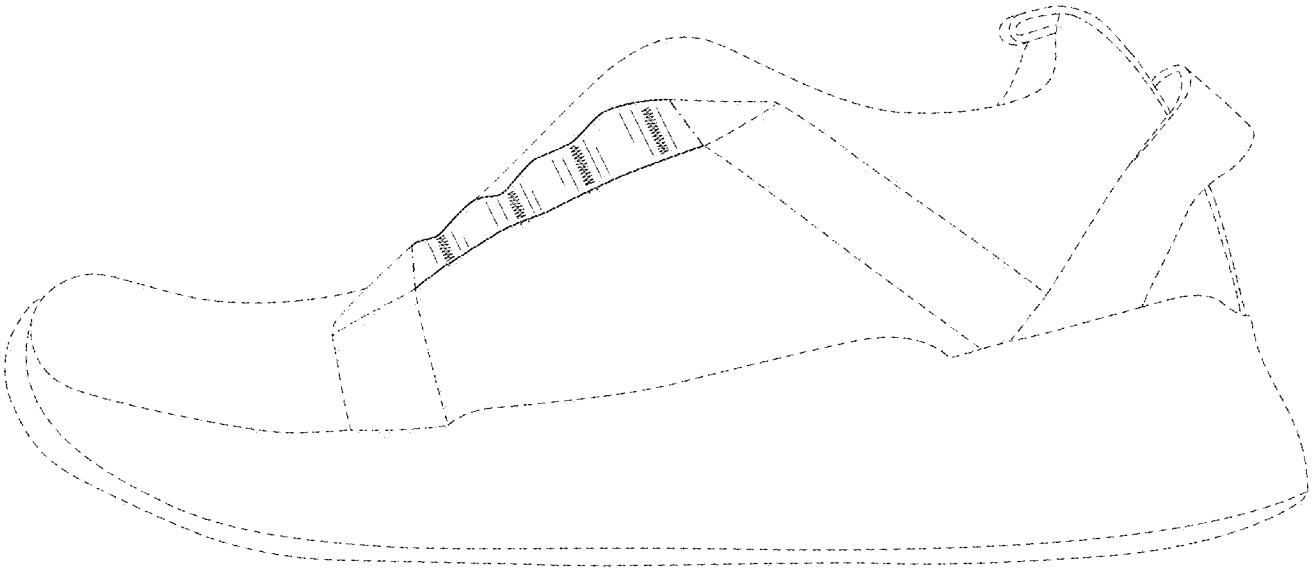
FIG. 2 (Amended)

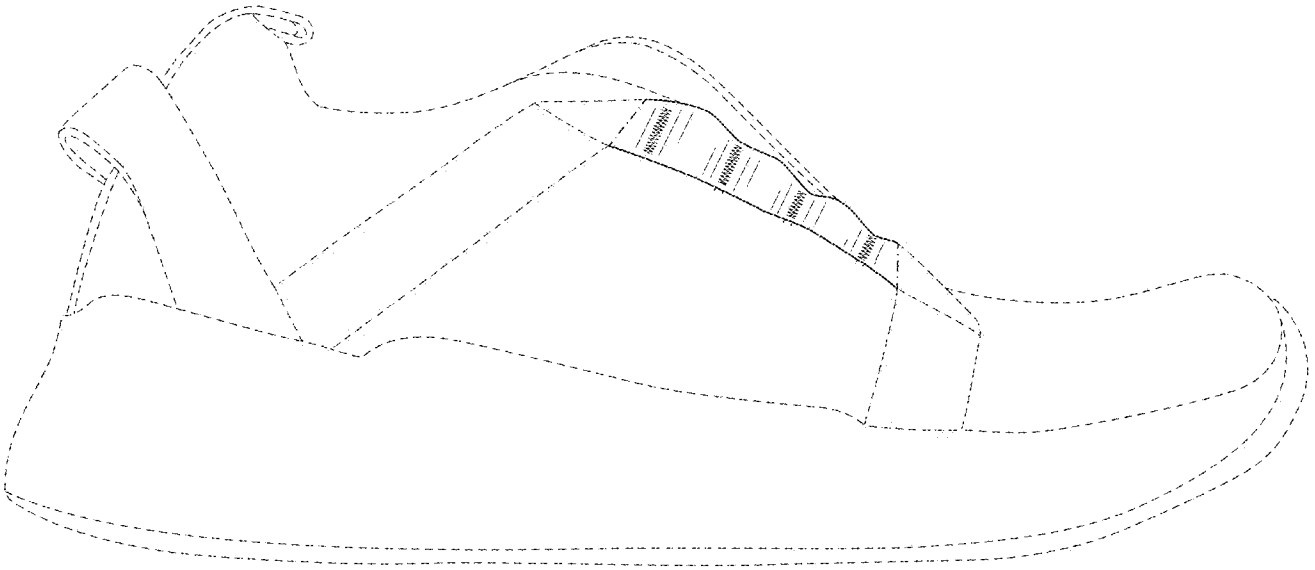
FIG. 3 (Amended)

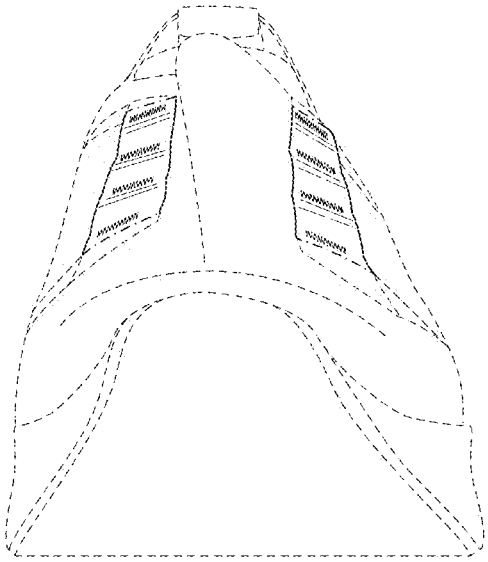
FIG. 4 (Amended)
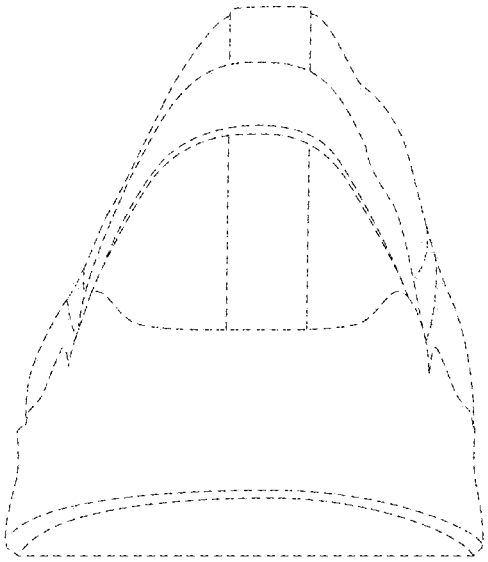
FIG. 5 (Original)

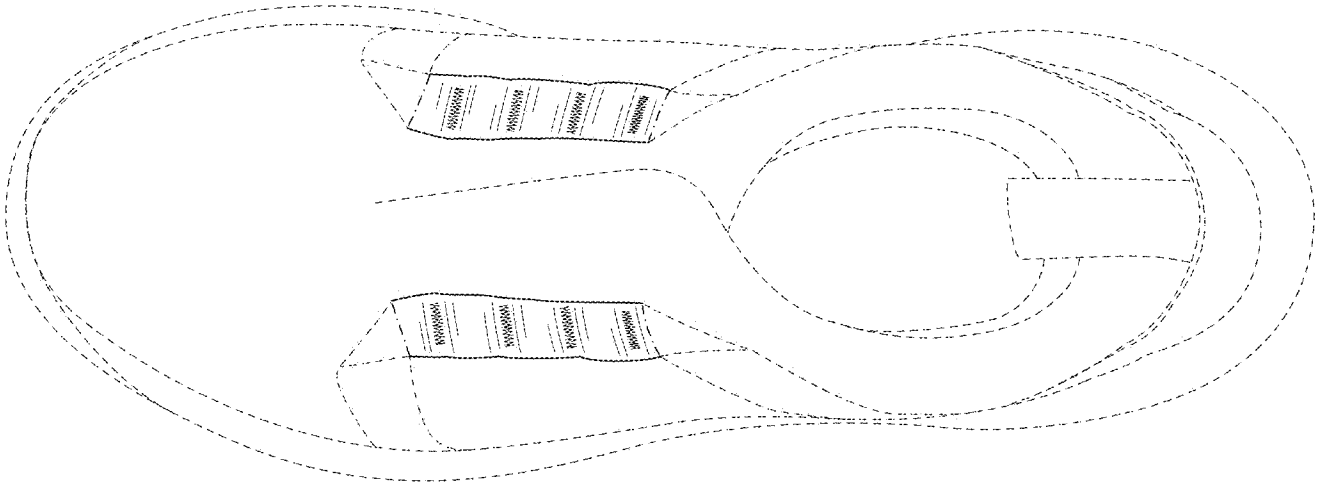
FIG. 6 (Amended)

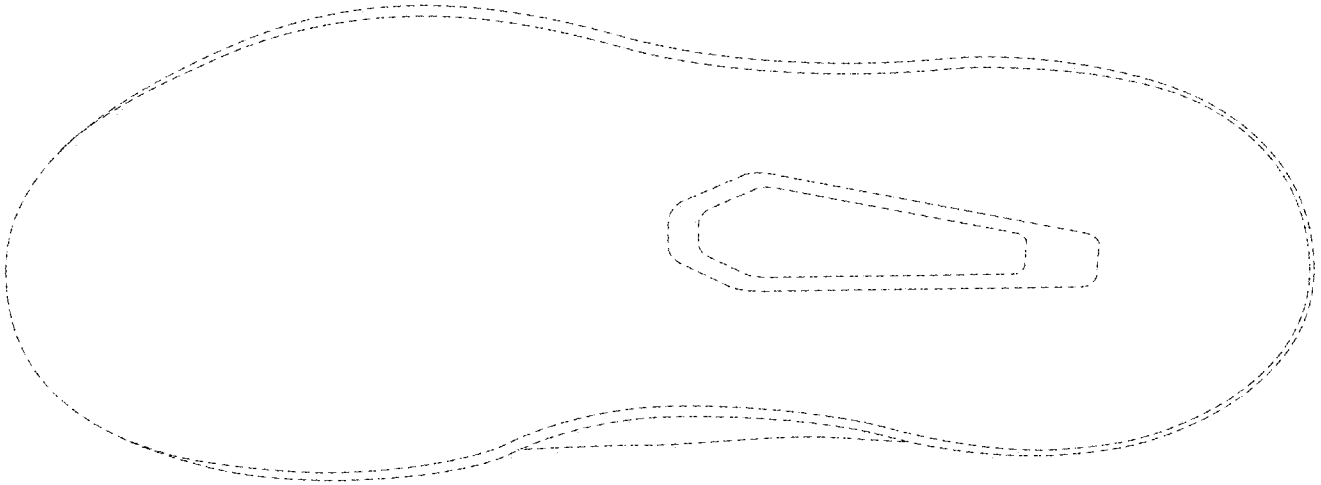
FIG. 7 (Original)